(12) United States Patent
Larkin

(10) Patent No.: US 8,340,253 B1
(45) Date of Patent: *Dec. 25, 2012

(54) PLUG-IN REMOTELY CONTROLLABLE TELEPHONE LINE TERMINATOR WITH PROTECTOR INTEGRATION

(76) Inventor: Kevin B. Larkin, Pebble Beach, CA (US)

( * ) Notice: Subject to any disclaimer, the term of this patent is extended or adjusted under 35 U.S.C. 154(b) by 710 days.

This patent is subject to a terminal disclaimer.

(21) Appl. No.: 12/424,689

(22) Filed: Apr. 16, 2009

(51) Int. Cl.
  *H04M 1/24* (2006.01)
  *H04M 3/08* (2006.01)
  *H04M 3/22* (2006.01)
(52) U.S. Cl. .................... 379/21; 379/27.05
(58) Field of Classification Search ............ 379/21, 379/27.05, 27.07, 29.11
See application file for complete search history.

(56) References Cited

U.S. PATENT DOCUMENTS

| | | | |
|---|---|---|---|
| 5,175,662 A * | 12/1992 | DeBalko et al. | 361/119 |
| 5,260,994 A * | 11/1993 | Suffi | 379/413.04 |
| 5,687,213 A * | 11/1997 | Larkin | 379/21 |
| 5,857,011 A | 1/1999 | Kennedy et al. | |
| 6,108,404 A | 8/2000 | Hardy et al. | |
| 6,185,083 B1 * | 2/2001 | Mathieu et al. | 361/119 |
| 6,201,853 B1 | 3/2001 | Butler et al. | |

* cited by examiner

*Primary Examiner* — Quoc D Tran
(74) *Attorney, Agent, or Firm* — Morgan, Lewis & Bockius LLP

(57) ABSTRACT

A telephone line terminator has a plug-in end to connect to a protector socket instead of the protector, which in turn is plugged in at a protector receptacle integrated with the terminator to provide continuous line protection while the terminator is connected to the telephone line. The terminator is dimensioned to fit in between adjacent protectors in a main frame. The terminator has circuitry powered by batteries to receive remote control signals for selectively ground connecting the wires. The batteries may be replaceable or rechargeable via voltage from the connected telephone line or via a separate charger that connects also via the plug-in end. A tone generator may provide a line tone and a warble tone in conjunction with several operation modes activated by a multi selecting push button.

20 Claims, 8 Drawing Sheets

PLUG-IN REMOTELY CONTROLLABLE TELEPHONE LINE TERMINATOR WITH PROTECTOR INTEGRATION

FIELD OF INVENTION

The present invention relates to remotely controllable telephone line terminators.

BACKGROUND OF INVENTION

Remotely controllable telephone line terminators are commonly employed at telephone line main frames while a service technician is remotely performing tests and measurements at the telephone line(s) the telephone line terminator is connected to. At a common main frame, a number of well known protectors are plugged in corresponding protector sockets that are mounted and wired in dense arrays. At the backside of the protector sockets, the telephone line wires are commonly wire wrapped around pins that connect to the sleeves of the female protector sockets.

In the prior art, telephone line terminators are commonly conductively connected to the telephone lines by use of well known alligator clamps that are clamped to the wire wrapped ends. Due to the commonly tightly arrayed protector sockets, access to their rear may be difficult if not impossible. Clamping on the wire wrapped line ends may also produce an unreliable contact and associated resistance that may degrade any test results remotely performed on the line(s). Clamping on to the wire wrap connections may also damage them. Therefore, there exists a need for conductively connecting a telephone line terminator reliably to a telephone line without involving the open line ends at the rear of the protector socket. The present invention addresses this need.

Further more, prior art telephone line terminators employ cable that connect the alligator clamps and the like in sufficient distance to the terminator apparatus such that the apparatus can be securely placed while the service technician is at the remote testing site. Such cables may introduce additional capacitance and resistance that again may undesirably effect the test measurements. Therefore, there exists a need for a telephone line terminator that can be connected to telephone lines without use of additional connection cables. The present invention addresses this need.

Also, prior art telephone line terminators connect commonly in a rather improvised fashion as described above. This requires them to be removed immediately after conducting the test measurements at the remote location, which may require substantial travel time back and forth for the service technician. Therefore, there exists a need for a telephone line terminator that provides a solid and reliable connection for extended connection durations. The present invention addresses also this need.

SUMMARY

A telephone line terminator has a plug-in end that corresponds to the protector sockets used in main frames. A plug side housing portion of the terminator extends form the plug-in end with a sufficiently small cross section to fit in between adjacent protectors that may be tightly arrayed in a main frame. To connect the telephone line terminator to a telephone line designated for testing, the respective protector is replaced by the telephone line terminator. The removed protector or a replacement protector may be plugged in a protector receptacle on the telephone line tester while itself remains connected to the protector socket. Circuitry inside the terminator provides remotely controllable termination of selected wires of the telephone line. The circuitry also through connects the protector in between testing operations such that the telephone line remains fully protected.

Utilizing the protector socket to connect the terminator provides optimized mechanical and electrical connection for most accurate measurements. In addition, the telephone line terminator may not need to be removed immediately following the testing since full protection of the line under test is maintained by the protector connected to the telephone line terminator.

The telephone line terminator features batteries to power its circuitry. The batteries may be replaceable and/or rechargeable. In case of rechargeable batteries employed, the circuitry may automatically detect voltage in the telephone line and charge from it the batteries at user selected time periods. An additional battery charger may be utilized to charge the batteries via the plug-in end.

The telephone line terminator may have a maximum overall cross section that is not larger than the plug-in boundary of the protector socket. In that way, a number of telephone line terminators may be connected side by side in a main frame. In that way, a service technician may perform multiple field line tests with only a single stop at the main frame.

DETAILED DESCRIPTION

Figure 1:
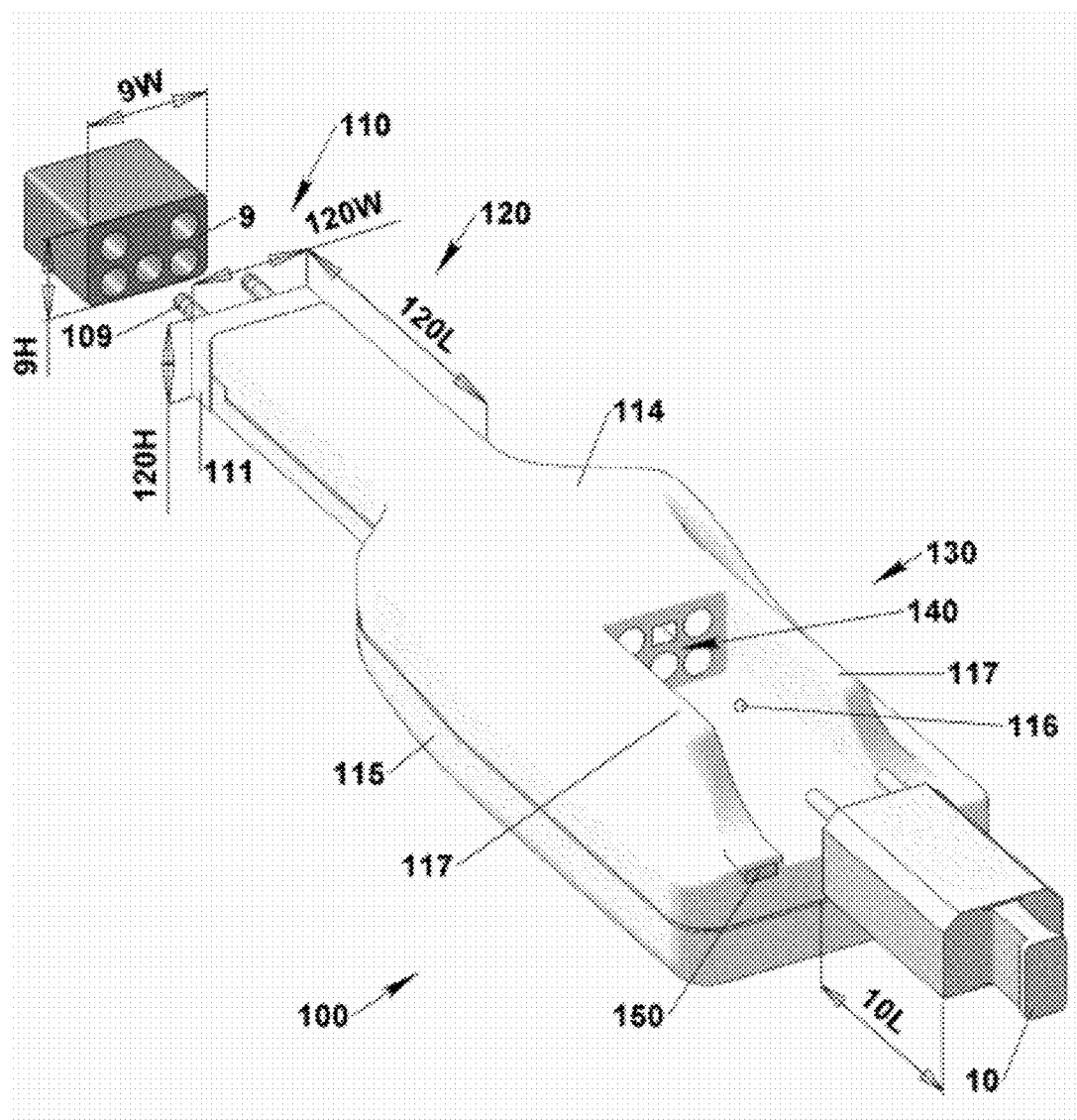
FIG. 1 is a first perspective view of a first embodiment of the invention together with a protector socket and a protector.

Referring to FIGS. 1-4 and in accordance with a first embodiment of the invention, a remotely operable telephone line terminator 100 has a plug-in end 110 corresponding to a protector socket 9 as is well known to be arrayed in telephone line main frames to electrically protect the telephone lines by use of well known protectors 10. From the plug-in end 110 extends a plug side housing portion 120 in a plug-in length 120L that is at least equal a protector length 10L.

Figure 3:
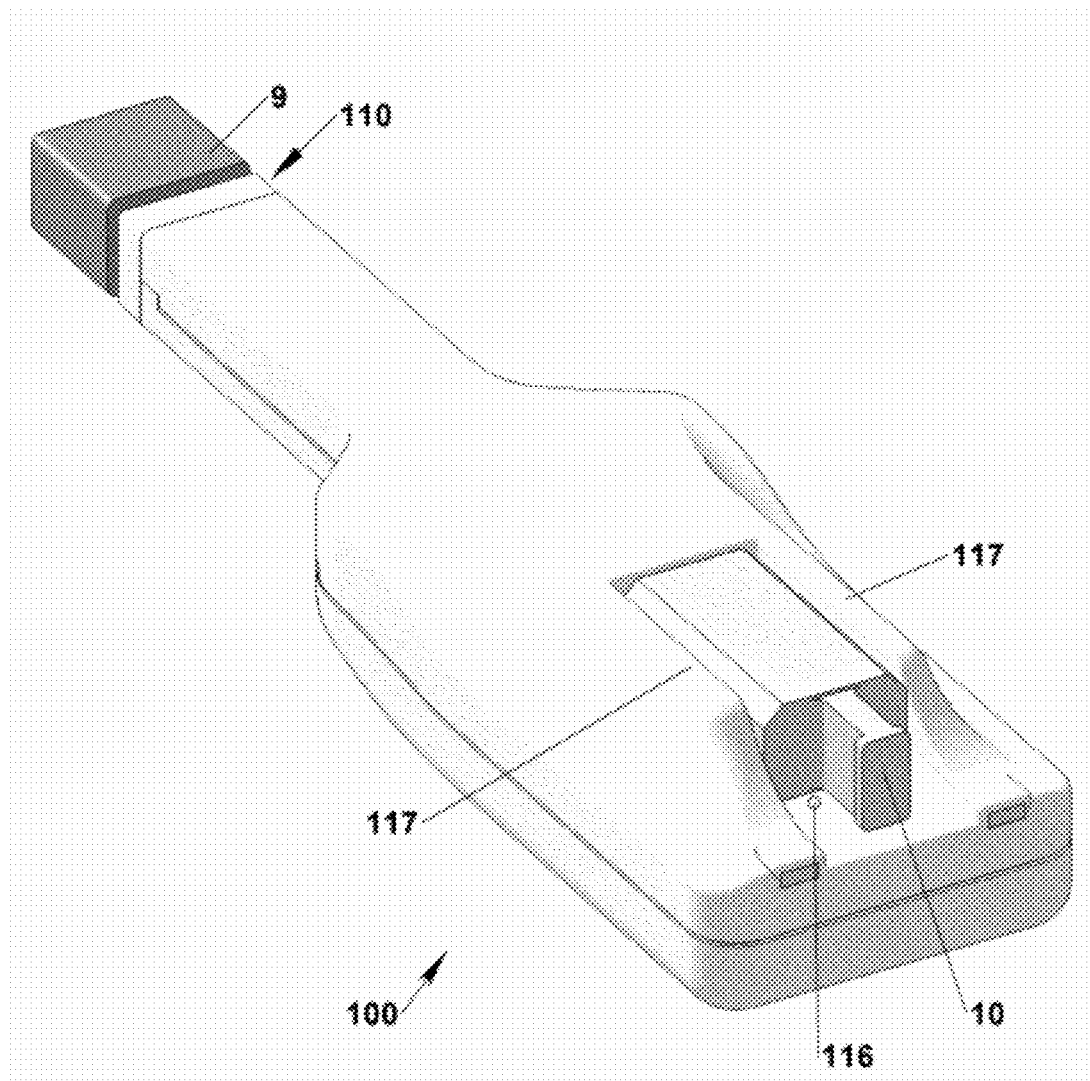
FIG. 3 is the first perspective view of the first embodiment in operational connection with the protector socket and the protector.
Figure 4:
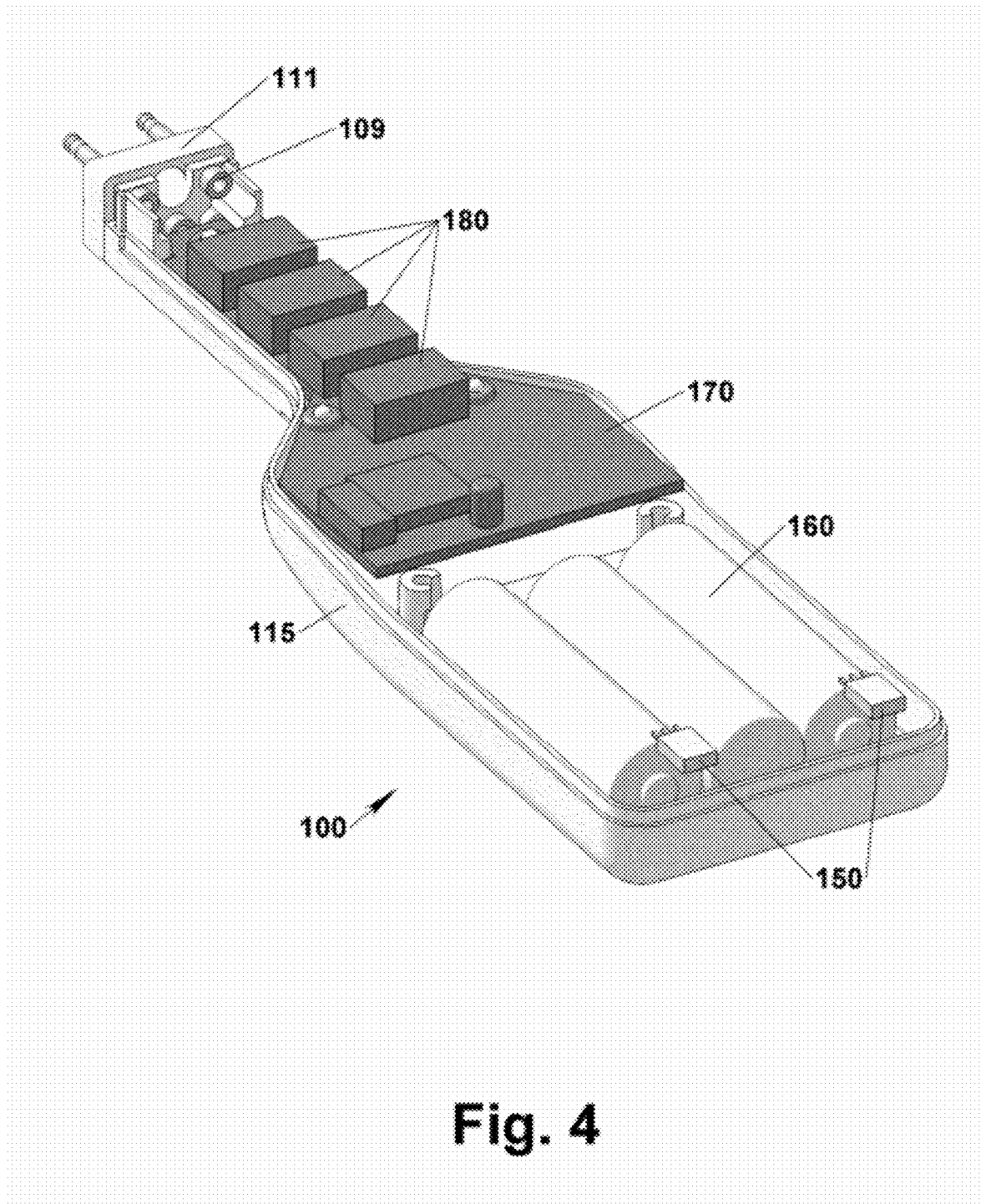
FIG. 4 is the first perspective view of the first embodiment with a portion of the housing and internal wiring removed.

Also, the plug side housing portion 120 features a cross section boundary 120W, 120H that fits within a plug-in boundary 9W, 9H of the protector socket while the plug-in end is plugged in the protector socket 9 with its connector pins 109 as shown in FIG. 3. The connector pins 109 are held in a frontal housing portion 111. In that way, the telephone line terminator 100 may be conveniently inserted into a protector socket 9 of a telephone line designated for testing after eventually removing a protector 10. The slim cross section boundary 120H, 120W provides for unimpeded access of the telephone line terminator 100 to the protector socket 9 even within a tight protector socket array loaded with protectors 10.

Integrated in the telephone line terminator 100 is a further more protector receptacle 140, a line termination circuitry 170 and batteries 160/161. The protector receptacle 140 is corresponding to the protector socket 9 such that a protector 10 fitting into the protector socket 9 may also be conductively connected to the protector receptacle 140. The protector receptacle 140 may be recessed at a forward end of a protector encompassing groove 116 that may be flanked by two lateral groove walls 117 as shown in FIG. 1. Once the protector 10 is inserted, it is substantially encompassed in the groove 116 such that it structurally supported while connected with the protector receptacle as shown in FIG. 3. This may be favorable in cases where a protector 10 remains connected with the telephone line terminator 100 for extended time periods and/or during transport and handling by the service technician. The connector standard the connector pins 109 and the protector socket 140 preferably comply with is the well known 5pin type connector standard.

The line termination circuitry 170 is remotely operable across the connector pins 109 at the plug-in end 110 as is well known for telephone line terminators. The line termination circuitry 170 preferably features a separate relay 180 for each signal wire making it a total of four relays 180. The relays 180 electrically connect and disconnect a signal line connector 109 with a ground connector 109 or with other signal line connector 109 in accordance with signal codes remotely sent via the tested telephone line as is well known in the art.

Figure 2:
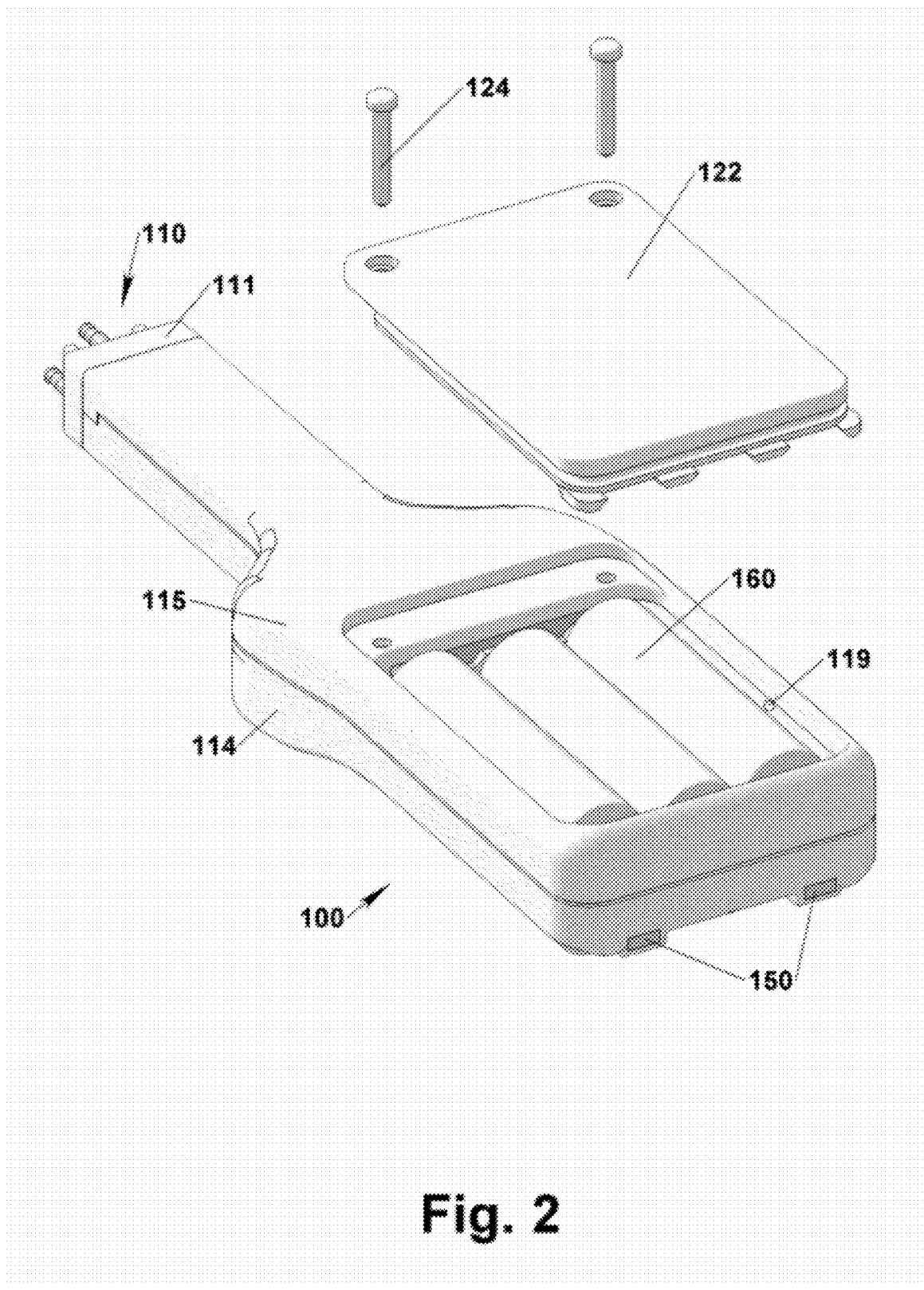
FIG. 2 is a second perspective view of the first embodiment with a battery lid removed.

The batteries 160 may be configured to provide power supply to the line termination circuitry 170 for a feasible operation period and may be replaced from the battery compartment 119 by removing lid screws 124 and battery compartment lid 122 as shown in FIG. 2. In that case the batteries 160 are preferably three AAA batteries supplying the line termination circuitry 170 with a about 4.5V. Indicator lights 150 may also be part of the telephone line terminator to indicated various well known apparatus states such as battery condition, whether or not the plugged in telephone line terminator is remotely activated and other well known operation modes.

Figure 5:
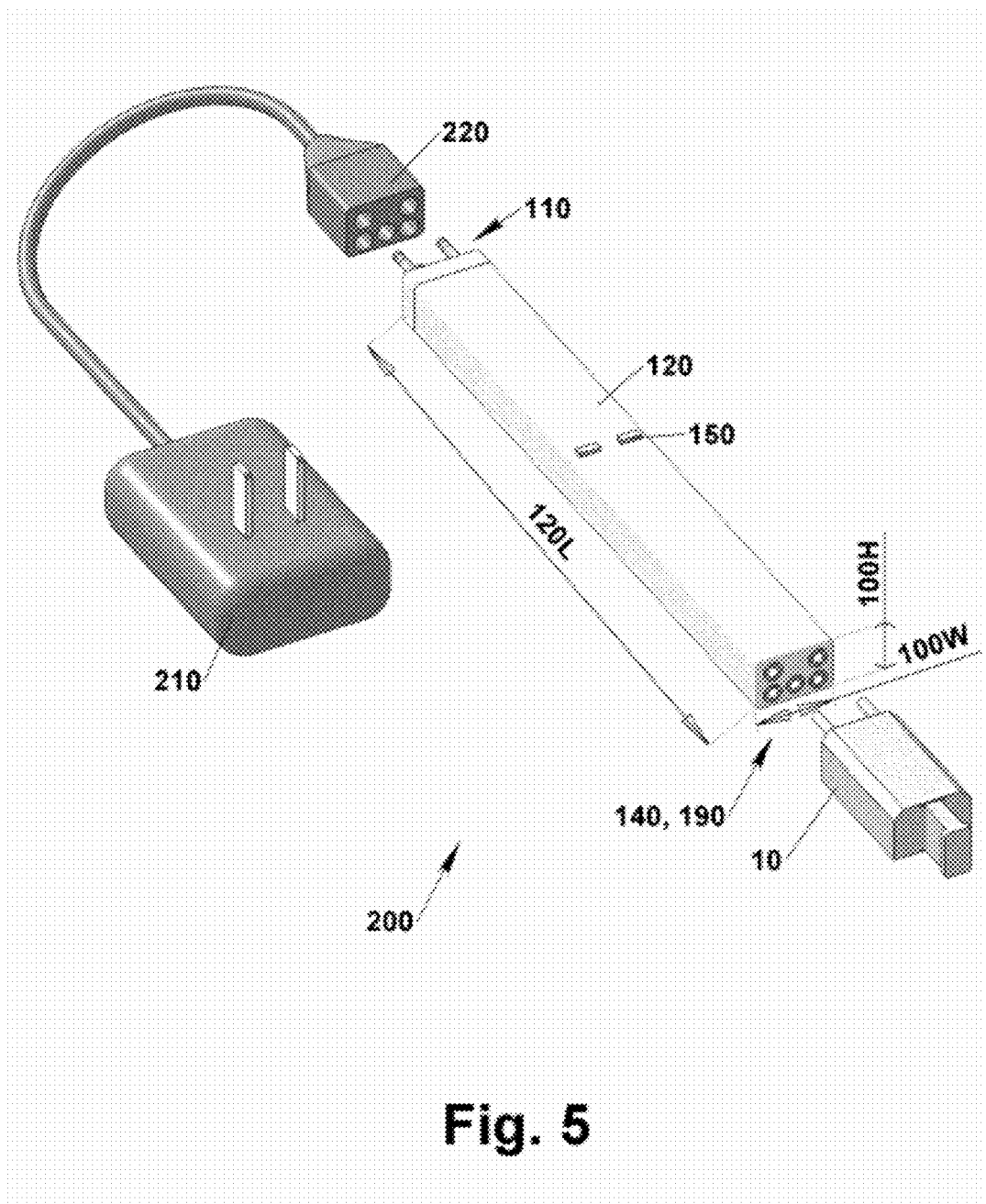
FIG. 5 is a third perspective view of a second embodiment of the invention.
Figure 6:
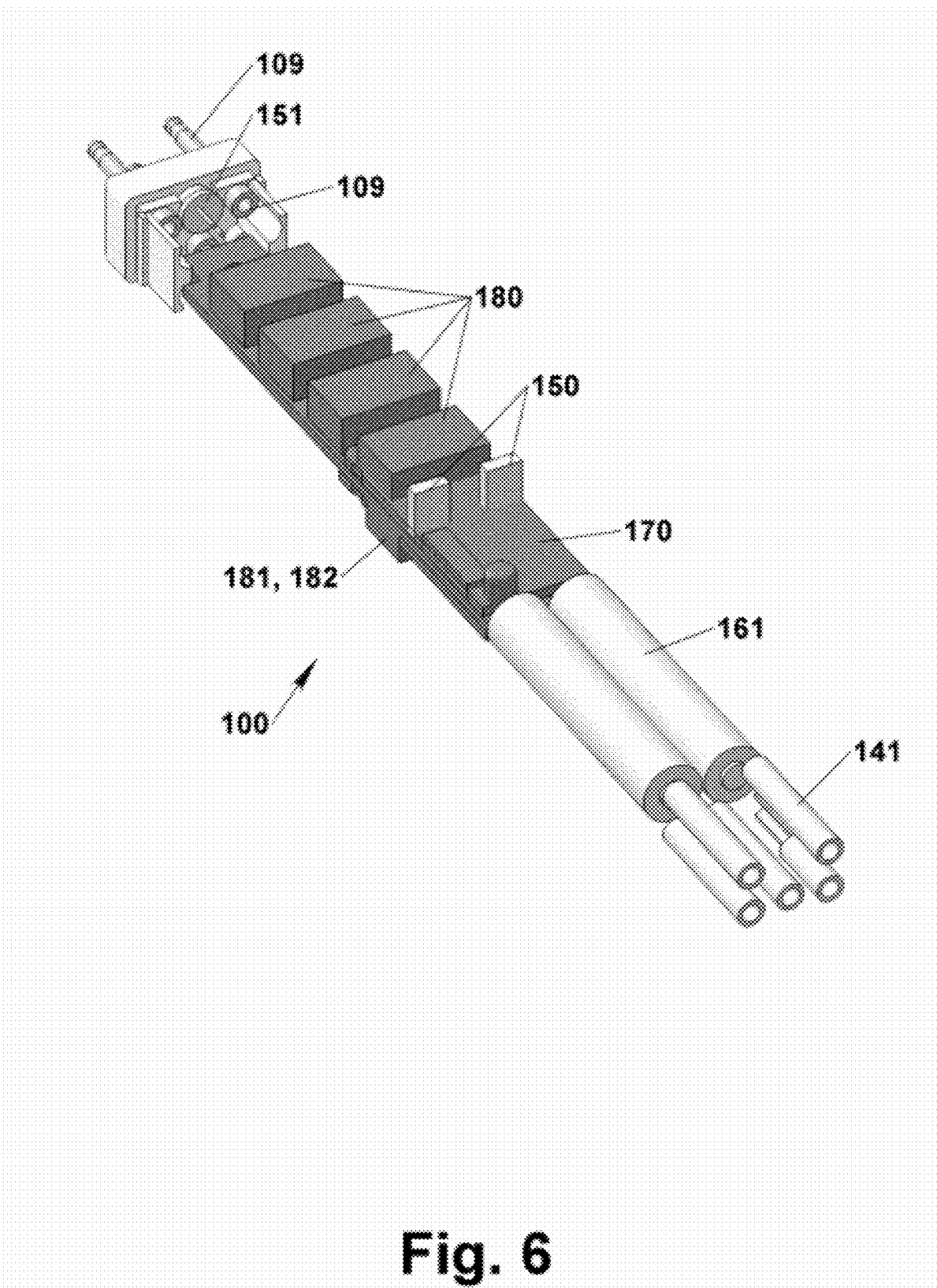
FIG. 6 is the third perspective view of the telephone line terminator of FIG. 5 without housing and without internal wiring.

In a second embodiment of the invention depicted in FIGS. 5, 6, the plug side housing portion 120 may extend to the rear end 190 of the telephone line terminator 100. The protector receptacle 140 is thereby positioned at the rear end 190 such that a protector 10 connected to the protector receptacle 140 is preferably in line with the main protrusion direction of the plug side housing portion 120. As a favorable result, an overall maximum cross section 100W, 100H of the telephone line terminator preferably together with a rear end 190 connected protector 10 is fitting within the plug-in boundary 9W, 9H. This provides a service technician with the possibility to insert a number of telephone line terminators with protectors 10 in adjacent protector sockets 9 inside a main frame. The service technician can then perform the field tests of all respective telephone lines without having to return in between to the main frame location.

The tight housing dimensions of the second embodiment may be accommodated by operating the line termination circuitry 170 at 3V powered preferably by two AAAA type batteries 161 as shown in FIG. 6. The batteries 160/161 may be rechargeable in case of which the line termination circuitry 170 may also feature a line voltage detection circuitry and an automated battery charge initiation circuitry that operate in conjunction with each other to charge the batteries 160/161 at predetermined electric conditions at selected connector pins 109 as may be well appreciated by anyone skilled in the art. Such predetermined electric conditions may be established by connecting a battery charger 210 to the telephone line terminator 100 or by connecting the telephone line terminator 100 in an idle condition to the protector socket 9.

The battery charger 210 may be powered via a conventional 110V or equivalent household type electric outlet. The battery charger 210 may be connected to the telephone line terminator 100 via the connector pins 109 by use of a charge connector 220 that complies with the same standard as the protector socket 9.

Figure 7:
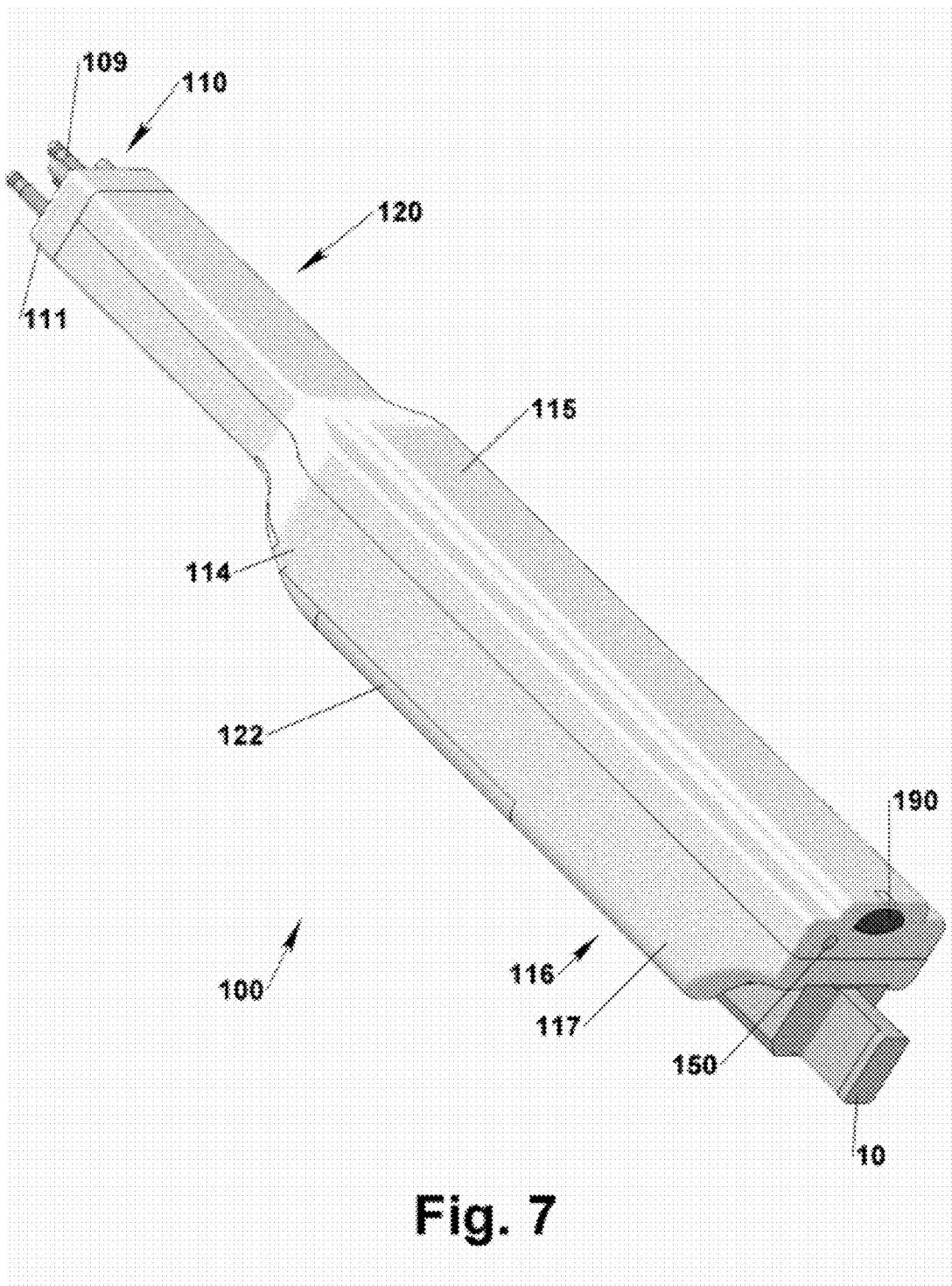
FIG. 7 is a fourth perspective view of a third embodiment of the invention.
Figure 8:
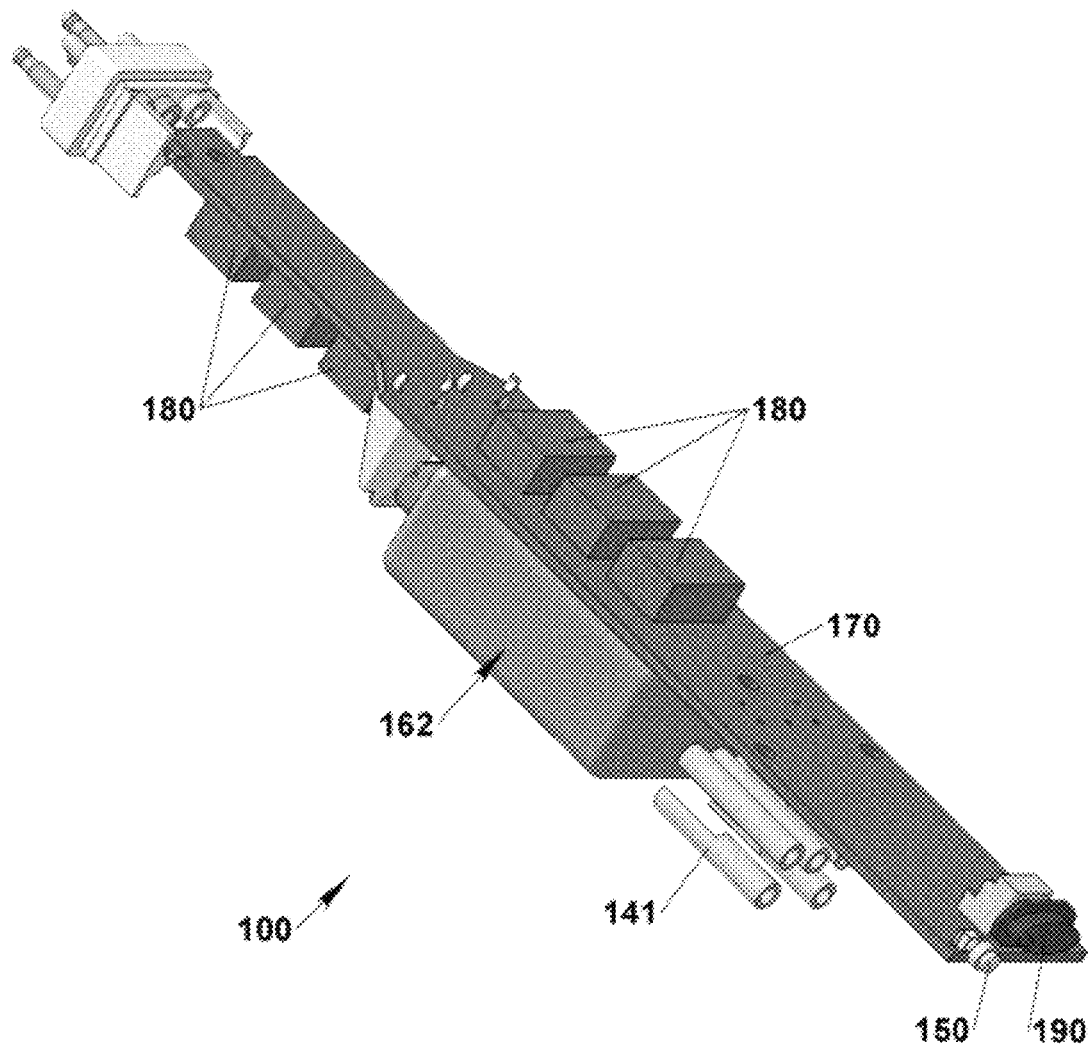
FIG. 8 is the telephone line terminator of FIG. 7 without main housing portions.

Referring to FIGS. 7, 8, a third embodiment of the telephone line terminator 100 may feature a 9V battery 162, a well known tone generator powered by the 9V battery 162 and a mode selecting push button 190. The multi selecting push button 190 may have preferably three functions. In a first function and when quickly pressed for a predetermined short time span like for example less than 2 seconds, a battery 162 test is performed by the line termination circuitry 170 and a battery 162 charge condition may be indicated by the indicator light 150. In a second function and when pressed for any duration between the short time span and a predetermined long time span like for example 5 seconds, the telephone line terminator 100 may be put in a passive ready mode. The telephone line terminator 100 may remain in that passive ready mode for a preset ready time like for example two hours. Battery 162 power may be connected to the telephone line while the telephone line terminator 100 remains transparent and not interfering with the tested telephone lines operation. During that time, the service technician may travel to the remote test site, hook up his butt-set at the remote end of the telephone line to which the telephone line terminator 100 is connected and remotely activate and operate the telephone line terminator 100 via the remote signal codes. The tone generator powered by the 9V battery 162 may provide a line tone such as a 578 Hz tone or a well known warble tone of alternating representative 1008 Hz and 893 Hz tones during a third function activated by pushing the push button 190 for more than the long time span. The 9V battery 162 may be replaceable and/or rechargeable similarly as described under the second embodiment of the invention.

To test a telephone line, a service technician may access a main frame and identify the protector socket 9 of the telephone line designated for testing. From the identified socket 9, the service technician may remove the protector 10 and insert the telephone line terminator 100 instead. In case a telephone line terminator 100 of the second embodiment is employed, immediately adjacent protector sockets may be loaded with other telephone line terminators 100 as well. A protector 10 is inserted at the protector receptacle. The indicator light may indicate to the service technician for example that the telephone line terminator 100 has contact via all connector pins and/or that the telephone line terminator 100 is ready for operation.

After placement of the telephone line terminator(s) 100, the service technician may travel to the field test site and active the line termination circuitry via well known signals transmitted across the tested line. The telephone line terminator selectively connects individual wires to ground or to each other and eventually performs other well known testing functions in accordance with the signal codes sent by the service technician as is well known in the art. Once testing is completed and upon sending of a test end signal and/or upon a preset testing time having passed, the telephone line terminator may return into idle mode during which the protector 10 is directly through connected via the line termination circuitry 170 with the protector socket 9.

Accordingly, the scope of the invention described in the Specification above and the Figures is set forth by the following claims and their legal equivalent:

What is claimed is:

1. A remotely operable telephone line terminator comprising:
   a plug-in end corresponding to a protector socket;
   a plug side housing portion extending from said plug-in end having a plug-in length at least equal to a protector length, said plug side housing portion comprising a cross section boundary that is configured to fit within a plug-in boundary of said protector socket while said plug-in end is plugged in said protector socket;
   a protector receptacle that is integrated in said remotely operable telephone line terminator and that corresponds to said protector socket; and
   a line termination circuitry that is remotely operable across a connector pin at said plug-in end, wherein said line termination circuitry is configured to be powered by a battery.

2. The remotely operable telephone line terminator of claim 1, wherein said battery is selected from the group consisting of: three AAA type batteries, two of AAAA type batteries, and one 9V battery.

3. The remotely operable telephone line terminator of claim 1, wherein said protector receptacle is recessed at a forward end of a protector encompassing groove.

4. The remotely operable telephone line terminator of claim 1, further comprising an indicator light configured to indicate an apparatus status.

5. The remotely operable telephone line terminator of claim 1, wherein said remotely operable line termination circuitry comprises a relay for electrically connecting and disconnecting one of said connector pin with one other connector pin.

6. The remotely operable telephone line terminator of claim 1, wherein said plug side housing portion extends to a rear end of said remotely operable telephone line terminator, and wherein said protector receptacle is positioned at said rear end such that an overall maximum cross section of said remotely operable telephone line terminator is configured to fit within said plug-in boundary.

7. The remotely operable telephone line terminator of claim 6, wherein said battery is comprised of two AAAA type batteries.

8. The remotely operable telephone line terminator of claim 6, wherein said battery is rechargeable, and wherein said line termination circuitry comprises a line voltage detection circuitry and an automated battery charge initiation circuitry that are configured to operate in conjunction with each other to charge said battery in response to detecting a predetermined electric condition at said connector pin.

9. The remotely operable telephone line terminator of claim 1, further comprising a mode selecting push button.

10. The remotely operable telephone line terminator of claim 9, wherein said mode selecting push button provides three functions in conjunction with said line termination circuitry and in conjunction with a predetermined short time span and a predetermined long time span, wherein:
   a first of said three functions is a battery charge condition indication function;
   a second of said three functions is a first passive ready mode of said remotely operable telephone line terminator in which said remotely operable telephone line terminator is ready for remote activation and operation and in which said remotely operable telephone line terminator provides a line tone to said telephone line; and
   a third of said three functions is a second passive ready mode of said remotely operable telephone line terminator in which said remotely operable telephone line terminator is ready for remote activation and operation and in which said remotely operable telephone line terminator provides a warble tone to said telephone line.

11. The remotely operable telephone line terminator of claim 10, wherein at least one of said line tone and said warble tone are provided by a tone generator, said tone generator being part of said line termination circuitry.

12. A rechargeable remotely operable telephone line termination system comprising:
   a battery charger comprising a protector socket;
   a remotely operable telephone line terminator comprising:
      a plug-in end corresponding to said protector socket;
      a plug side housing portion extending from said plug-in end having a length at least equal to a protector length, said plug side housing portion comprising a cross section boundary that is configured to fit within a plug-in boundary of said protector socket while said plug-in end is plugged in said protector socket;
      an integrated protector receptacle corresponding to said protector socket;
      a remotely operable line termination circuitry that is remotely operable across a connector pin of said plug-in end, wherein said line termination circuitry comprises a line voltage detection circuitry and an automated battery charge initiation circuitry that are configured to operate in conjunction with each other to charge said battery in response to detecting a predetermined electric condition at said connector pin, wherein said line termination circuitry is configured to be powered by a rechargeable battery.

13. The remotely operable telephone line termination system of claim 12, further comprising an apparatus status indicator light.

14. The remotely operable telephone line termination system of claim 12, wherein said remotely operable line termination circuitry comprises a relay for remotely electrically disconnecting one of said connector pin from one other of said connector pin.

15. The remotely operable telephone line termination system of claim 12, wherein said plug side housing portion extends to a rear end of said remotely operable telephone line terminator, and wherein said integrated protector receptacle is positioned at said rear end such that an overall maximum cross section of said remotely operable telephone line terminator is configured to fit fitting within said plug-in boundary.

16. The remotely operable telephone line termination system of claim 15, wherein said battery is comprised of two AAAA type batteries.

17. The remotely operable telephone line termination system of claim 12, further comprising a mode selecting push button.

18. The remotely operable telephone line termination system of claim 17, wherein said mode selecting push button provides three functions in conjunction with said line termination circuitry and in conjunction with a predetermined short time span and a predetermined long time span, wherein:

a first of said three functions is a battery charge condition indication function;

a second of said three functions is a first passive ready mode of said remotely operable telephone line terminator in which said remotely operable telephone line terminator is ready for remote activation and operation and in which said remotely operable telephone line terminator provides a line tone to said telephone line; and a third of said three functions is a second passive ready mode of said remotely operable telephone line terminator in which said remotely operable telephone line terminator is ready for remote activation and operation and in which said remotely operable telephone line terminator provides a warble tone to said telephone line.

19. The remotely operable telephone line termination system of claim 18, wherein at least one of said line tone and said warble tone are provided by a tone generator, said tone generator being part of said line termination circuitry.

20. The remotely operable telephone line termination system of claim 19, wherein said battery is a 9V battery.

* * * * *